United States Patent [19]

Huxsoll et al.

[11] 3,950,556

[45] *Apr. 13, 1976

[54] PROCESS FOR PEELING FRUITS AND VEGETABLES

[75] Inventors: Charles C. Huxsoll, Moraga; Merle L. Weaver, Martinez; Robert P. Graham, El Cerrito, all of Calif.

[73] Assignee: The United States of America as represented by the Secretary of Agriculture, Washington, D.C.

[ * ] Notice: The portion of the term of this patent subsequent to Sept. 18, 1990, has been disclaimed.

[22] Filed: Jan. 24, 1974

[21] Appl. No.: 436,234

[52] U.S. Cl. .................................. 426/287; 426/483
[51] Int. Cl.² ........................................... A23L 1/10
[58] Field of Search ..................... 426/287, 482, 483

[56] References Cited
UNITED STATES PATENTS

| | | | |
|---|---|---|---|
| 3,115,174 | 12/1963 | Loveland | 426/287 |
| 3,115,176 | 12/1963 | Walker | 426/287 |
| 3,211,204 | 10/1965 | Adams | 426/287 |
| 3,547,173 | 12/1970 | Graham | 426/287 |
| 3,618,651 | 11/1971 | Hart | 426/287 |
| 3,759,160 | 9/1973 | Huxsoll | 99/233.3 |

*Primary Examiner*—Norman Yudkoff
*Assistant Examiner*—Hiram H. Bernstein
*Attorney, Agent, or Firm*—M. Howard Silverstein; William Takacs; Max D. Hensley

[57] ABSTRACT

System for peeling fruits or vegetables wherein the peel is loosened by a double treatment with lye, each treatment being followed by a holding period. After the second holding period, the peel is removed directly, that is, without any application of radiant or other heat.

6 Claims, No Drawings

PROCESS FOR PEELING FRUITS AND VEGETABLES

This invention relates to and has among its objects the provision of novel processes for peeling fruits and vegetables, especially potatoes. Further objects of the invention will be evident from the following description wherein parts and percentages are by weight unless otherwise specified.

In the following description, emphasis is directed to the peeling of potatoes. This is by way of illustration and not limitation. In its broad compass the invention is applicable to all types of root vegetables such as potatoes, sweet potatoes, beets, carrots, radishes, turnips, and the like. In addition, the process may be applied to fruits such as apples, pears, peaches, apricots, nectarines, etc.

In conventional practice in food processing plants, potatoes are peeled by applying the following procedure: The potatoes are immersed in hot lye solution—e.g., a solution containing about 20% NaOH and maintained at about 180°–200° F. The potatoes are held in the lye solution until the peels are softened and loosened. Then, the tubers are removed and subjected to strong jets of water while rotated or tumbled about to expose all surfaces to the jets whereby the lye-loosened skin is flushed off the tubers. Although this procedure provides effective peeling, it has the disadvantage that it produces a large volume of wash water containing organic matter and sodium hydroxide. The disposal of this waste liquor presents a serious problem. If discharged directly into a stream it causes pollution of the water course. Moreover, biological destruction by ponding or the like is slow and inefficient, particularly because of the high alkalinity of the liquor. Of course, the liquor could be neutralized but this would involve additional expense for acid and for equipment for metering the acid and maintaining a predetermined pH. Because of the present emphasis by federal, state, and local governments on pollution control, food processors who rely on the procedure in question are facing a crisis--they must devise a disposal system which not only meets anti-pollution standards, but also does the job economically so that they can stay in business. A failure to meet these criteria means that the oprations must be shut down.

In a previous U.S. Pat. No. (3,517,715 by Graham, Huxsoll, Hart, and Weaver, hereinafter referred to as '715) a process is described whereby potatoes are peeled in the dry state. This process involves an initial treatment with lye followed by heating with radiant heat and removal of the loosened peel by dry-brushing. Indeed, '715 obviated some of the problems outlined above by eliminating the conventional step of removing the lye-loosened peel with water, thereby reducing caustic usage and peel loss. However, certain other problems remained. These included the deleterious effects of shattering and the difficulty in removing the green layer without destruction of a large portion of the potato flesh.

Our U.S. Pat. No. 3,759,160 (hereinafter referred to as '160) represents an improvement over the procedure of '715. In accordance with '160, potato peels are loosened by a double treatment of the tubers with hot lye solution, each treatment being followed by a holding period. After the second holding period, the potatoes are exposed to radiant heat and the loosened peel is removed by dry-brushing. The procedure provides these advantages: Deleterious shattering effects are avoided and facile removal of the green layer is achieved without excessive destruction of potato flesh. A disadvantage of '160, however, is that considerable energy is expended in the radiant heating step. With the emphasis currently placed on conservation of fuels, the expenditure of large amounts of energy as required in the radiant heating step of '160 is undesirable.

A primary object of the invention is the provision of peeling methods which obviate the problems outlined above.

In a practice of the invention the potato peel is loosened by employing two lye-dipped steps, each followed by a holding period. Then, without application of radiant or other heating, the loosened peel is removed by dry-brushing. The primary advantage of the invention is the reduction in the amount of energy consumed. This advantage is realized because the present process does not use the radiant heating step of '160 or any equivalent thereof. Moreover, the fact that the present process is operative is surprising and unexpected because the teaching of '160 is that the radiant heating step is an essential part of the total peeling system.

The process of the invention, moreover, has the advantage of low lye consumption as in the process of '160. A first treatment with lye deposits a thin film of caustic on and in the surface layers of peel tissue. Then, the potato is held for a period of time to allow the lye to penetrate and attack said tissue. The potato is again subjected to hot caustic to supplement the first treatment. Finally, the so-treated potato is held for a period of time to complete the cellular destruction. In previous processes much more concentrated lye solutions were required because disintegration of the peel resulted solely from the strength of the caustic. The present invention is effective because of its combination of lye-dipping steps and holding periods, said combination providing a means for metering an amount of lye necessary (but not excessive) to loosen the peels. Thus, peeling is accomplished with a minimum expenditure of caustic. In addition, since much less concentrated caustic is necessary for the peelings, less lye is lost due to the actual physical adherence of droplets to the surface of the potato. By application of the invention the amount of caustic consumed during operations is reduced by about a factor of 4 from about 0.2 to 0.6 lb. of sodium hydroxide per 100 lbs. of potatoes (loss occurring in known processes including '715) to 0.05 to 0.1 lb. of sodium hydroxide per 100 lbs. of potatoes (loss occurring in the invention). Since the cost of lye is a major contributor to the total expenses incurred by the processor, the savings to the potato industry will be substantial.

As with '715 and '160, the process of the invention does not yield a liquid waste material. It yields a solid waste which can be converted to feed for livestock or other useful products.

In addition, the process of the invention provides effective peeling so that the peeled tubers are adapted for all conventional uses as in preparing dehydrated, prefried frozen, canned, and other potato products. The peeling losses usually average only about 5 to 15%, depending on the age of the potato, and the variety thereof. In this respect, it should be noted that peeling losses between 5 and 15% are recognized by the industry as representative of good peeling. Efficient peeling, of course, occurs when most of the peel tissue is removed with little or no removal of the potato flesh.

Low peeling losses, i.e., less than 5% are not desirable for the simple reason that much of the peel remains on the potato. Excessive peeling losses, i.e., greater than 15% are also avoided because such figure represents removal of potato flesh as well as peel. It should be noted, however, that peel losses greater than 15% may be necessary where the skin of the potato is excessively thick because of extended maturity. The invention also provides better removal of eyes and other defects for a given amount of peel.

Another advantage of the invention is that it reduces shattering and is, together with '160, superior to all other potato-peeling processes including '715. Shattering occurs at times as a result of the high turgidity of certan tubers. After the potatoes are peeled, they are cut into pieces, for example, strips for French fries, etc. Shattering usually occurs during cutting as the tubers are contacted by the blade and leaves the potatoes with crack marks throughout. Usually, such minor crevices give undesirable dark-colored lines and absorb excess oil when the potato strip is fried. However, in extreme cases the strips break along the shattering lines and the product is useless.

Still another advantage of the invention is that the green layer, found randomly dispersed just beneath the skin of nonmature potatoes, is effectively removed. If not removed, said layer can lead to an undesirable product. The problem is that the green layer is very resistant to the action of caustic, while the peel of the immature tuber is delicate and very little lye is needed to loosen same. By employing the techniques of the invention, removal of the green layer is accomplished with minimum destruction of the fleshy tissue of the potato. Removal of a large portion of such fleshy material in certain areas so that holes remain is known in the art as "cratering."

DETAILED DESCRIPTION OF THE INVENTION (I) In a practice of the invention, potatoes are first contacted with aqueous lye (NaOH). This is best done by immersing the tubers in the lye solution. Alternatively, the lye solution may be applied by spraying, brushing, or the like. Generally, the solution will contain about 1 to 10% of NaOH. The concentration of caustic depends on the maturity and the variety of the tubers to be peeled. Freshly harvested potatoes have thin skins, and defects such as eyes are not very deep. Conequently, only a minimum amount of lye is needed to loosen the peel. Thus, the potatoes are dipped in about 1 to 10% sodium hydroxide for approximately 5–30 seconds. On the other hand, tubers which have been stored have thicker skins and deeper defects, thus necessitating the use of about 5–10% sodium hydroxide for a period of approximately 30–60 seconds. If skins are excessively thick, the upper limit of lye concentration and contact time may be increased. In both cases the caustic is kept hot, i.e., at about 160°–217° F. so it will penetrate rapidly into the corky tissue of the peel. As a general rule, the conditions should be adjusted such that the concentration of lye in the first step is as low as possible to produce the desired peeling. The temperature should be maintained as high as practicable to promote rapid reaction of the caustic with the peel.

(II) Next, the lye-treated potatoes are held at ambient temperature for a period of approximately 5–30 minutes to allow the lye time to react with the peel tissue to make it more penetrable. Alternately, the potatoes may be either maintained in warm air, or heated with steam. If the former conditions are used, the temperature of the warm air may be varied over a wide range. However, good results are attained at about 120°–160° F. The warm air dries the caustic on the surface, thereby increasing the caustic concentration. Additional heat applied to the peel during the warm air treatment further accentuates the degradative action of the lye. If the latter conditions are employed, the potatoes may be heated with steam at about 100°–150° F. for about 5–30 minutes. Often, it is desirable to hold the potatoes at ambient temperature for about 3 to 5 minutes prior to and immediately after the treatment with steam. In this way the lye can penetrate the peel tissue and the application of steam will not dilute the caustic, thereby decreasing its disintegrative powers. The particular conditions employed are again subject to the maturity and the variety of the tubers, more severe conditions being necessary to loosen the thick peel of mature potatoes. The importance of the holding period may be explained as follows: The first treatment with lye deposits a film of caustic on the potato peel. Generally, the peel is of uneven thickness and contains many defects. The holding period allows the lye to penetrate the peel, which initially is very resistant to such penetration. The holding period also allows the lye to penetrate into the thicker parts of the peel, into the peel tissue containing the defects, and into the tissue around the eyes. As a result, cratering is avoided.

(III) After said holding period, the potatoes are again treated with caustic. In this step the potatoes are dipped in about 2–10% sodium hydroxide at about 160°–217° F. for periods of about 30 seconds to about 4 minutes. The strength of the lye is dependent on the severity of the conditions of the first lye treatment. Generally, if the lye solution in the first lye treatment is concentrated, the amount of caustic necessary in the second treatment is small and vice versa. Usually, it is preferred, however, that the concentration of lye in the first step be greater than that in the second step. Stronger lye is necessary in the first step to overcome the imperviousness of the peel. This being accomplished, the peel becomes much more susceptible to penetration by the lye. Consequently, in the second step the peel will absorb more lye. Thus, the concentration of lye in the second step should be as high as necessary to finish destruction of the peel with minimal lye uptake.

Another factor influencing lye uptake is the contact time between the lye and the potatoes; the longer the contact time, the greater the consumption of caustic. Contact time is inversely proportional to the temperature of the caustic solution. Generally, high temperatures, 180°–217°, are preferred because such temperatures permit very short contact times, i.e., 30–60 seconds. However, if the temperature of the first caustic bath is high, e.g., 185°–217° F., lower temperatures, 160°–180° F., may be employed in this step while still maintaining a very short contact time between the potatoes and the caustic. It should be noted that caustic temperatures below 160° F. are undesirable since contact time and consequently lye consumption are increased by factors of 3 to 5, thereby eliminating much of the benefit of the invention. High caustic temperatures are also preferred in this step because degradation of the peel is facilitated. As a result, the radiant heating step required in '160 is no longer necessary and good peeling can be obtained in the absence of such heating.

In the case of fruits or vegetables that require a highly polished surface on the flesh after removal of the peel, it is generally preferred to maintain contact between the lye and such fruits and vegetables for longer periods. Also for this purpose, high caustic temperatures are desirable. Thus, for example, sweet potatoes and beets are subjected to caustic temperatures of about 200°–217° F. and contact times of 1–4 min. in the second treatment with lye. Under such conditions, the material is not only efficiently peeled but also attains a highly-polished, gelatinized, peeled surface. Alternatively, to avoid prolonged contact between the material to be peeled and the high-temperature lye solution, gelatinization can be accomplished by preheating the surface with steam for 1–5 min. prior to contact with caustic. The preheated product can be subjected to the standard procedures of the inventions. As a result, lye uptake is minimized and, at the same time, a highly polished, peeled surface is obtained.

(IV) The so-treated potatoes are subjected to another holding period from approximately 15 seconds to 5 minutes, usually at ambient temperature. This step permits drainage of unabsorbed lye as well as allowing the second lye treatment to be most effective in loosening the remainder of the peel. As in the first holding period, the potatoes may alternatively be either maintained in warm air or heated with steam. (V) Directly following the second holding period, the loosened peels are removed from the potatoes by subjecting the tubers to friction--for example, brushing--applied in the dry state. Excellent results are obtained by contacting the potatoes with a rotating cylinder, the surface of which is covered with protruding fingers of soft rubber, Neoprene, or other elastomer. The non-abrasive brushing effect obtained by the action of these fingers striking against the tubers causes the loosened peel to be dislodged quickly and without removal of any significant amount of potato flesh. Moreover, the peeling action is so effective that even the peel at indented areas (eyes) is removed. For large-scale operations, one may provide several drums (provided with soft rubber fingers) arranged with their axes parallel, and driven in such manner that each adjacent pair of drums rotate in opposite directions. By applying the treated potatoes to such an arrangement the tubers are continuously rolled and tumbled while being brushed by the rubber fingers, and the loosened peel is quickly dislodged.

The peeled potatoes are then ready for processing into any selected end product by conventional procedures. The removed peel can be readily collected and used in the preparation of animal feeds.

EXAMPLES

The invention is further demonstrated by the following illustrative examples. Two of the runs included in the examples (namely, Example 1, Lots C and D) are not illustrative of the invention, but are provided for purposes of comparison.

EXAMPLE 1

A batch of potatoes (U.S. No. 1, Russet Burbank, 8 months old) was divided into several lots, each lot being treated as follows:

Lot A. The potatoes were weighed and then dipped in an aqueous solution of 10% sodium hydroxide at 190° F. for 45 sec. The potatoes were removed from the bath and held 15 minutes at ambient temperature. Then, the tubers were dipped in 5% sodium hydroxide at 190° F. for 45 seconds, removed from the bath, and held at ambient temperature for 3 minutes. The so-treated potatoes were placed in a rotating drum, the surface of which was covered with protruding soft rubber fingers. The peel—including that in the eyes—was quickly and effectively removed by the brushing action that occurred as the drum was rotated. The product was weighed to determine the average peeling loss. The consumption of sodium hydroxide was determined by standard procedures and expressed in pounds per 100 pounds of potatoes.

Lot B. The above procedure was repeated with the following exception: The duration of the second lye dip was 60 sec.

Lot C. (Not in accordance with the invention) The potatoes were weighed and dipped in an aqueous solution of 10% sodium hydroxide at 190° F. for 30 sec. The potatoes were removed from the bath and held for 15 min. at ambient temperature. Then, the tubers were dipped in 3% sodium hydroxide at 190° F. for 60 sec., removed from the bath, and held at ambient temperature for 3 min. The so-treated potatoes were rotated for 60 sec. under a propane-fired radiant heater having a power output of 30,000 B.t.u. per hour. The so-treated potatoes were peeled and determinations were made, as described above.

Lot D. (Not in accordance with the invention) The potatoes were weighed and dipped in an aqueous solution of 10% sodium hydroxide at 200° F. for 60 sec., held at ambient temperature for 3 min., and then rotated under radiant heat for 90 sec., as in Lot C. The so-treated potatoes were peeled and determinations were made, as described above.

The results are tabulated below:

| Lot | First dip | First hold | Second dip | Second hold | Radiant heat | Peel loss (%) | Consumption of NaOH (lbs/100 lbs. potatoes) |
|---|---|---|---|---|---|---|---|
| A | 10% NaOH 190° F. 45 sec. | 15 min. ambient | 5% NaOH 190° F. 45 sec. | 3 min. ambient | Not used | 11.4 | 0.066 |
| B | 10% NaOH 190° F. 45 sec. | 15 min. ambient | 5% NaOH 190° F. 60 sec. | 3 min. ambient | Not used | 13.3 | 0.077 |
| C (Control) | 10% NaOH 190° F. 30 sec. | 15 min. ambient | 3% NaOH 190° F. 60 sec. | 3 min. ambient | 60 sec. | 10.0 | 0.065 |
| D (Control) | 10% NaOH 200° F. 60 sec. | 3 min. ambient | Not used | Not used | 90 sec. | 10.3 | 0.085 |

EXAMPLE 2

The procedure described in Example 1, Lot A, was repeated with variation as to the conditions of treatment. The potatoes were two batches of Russet Burbanks—one field run tubers 10 months old, the other U.S. No. 1, 8 months old.

The conditions employed and the results obtained are tabulated below.

| Type of potato | First dip | First hold | Second dip | Second hold | Peel loss (%) |
|---|---|---|---|---|---|
| Field run Russet Burbank (10 mos. old) | 10% NaOH 190° F. 45 sec. | 15 min. ambient | 5% NaOH 170° F. 60 sec. | 3 min. ambient | 11.7 |
| Ditto | 10% NaOH 190° F. 45 sec. | 15 min. ambient | 5% NaOH 170° F. 90 sec. | 3 min. ambient | 12.4 |
| Ditto | 10% NaOH 170° F. 60 sec. | 15 min. ambient | 5% NaOH 200° F. 45 sec. | 3 min. ambient | 9.6 |
| Ditto | 10% NaOH 190° F. 45 sec. | 5 min. ambient | 5% NaOH 190° F. 45 sec. | 3 min. ambient | 11.4 |
| U.S. No. 1 Russet Burbank (8 mos. old | 10% NaOH 190° F. 45 sec. | 15 min. (140°F air) | 5% NaOH 190°F. 45 sec. | 3 min. ambient | 13.0 |
| Ditto | 10% NaOH 190° F. 45 sec. | 15 min. ambient | 5% NaOH 190° F. 45 sec. | 3 min. (140°F air) | 13.0 |

EXAMPLE 3

The procedure described in Example 1, Lot A, was repeated for sweet potatoes, red beets, and red delicious apples. The conditions in each case were varied. The conditions used and the results are summarized below. In the case of sweet potatoes and red beets the peeled material exhibited a desired polished surface.

| Type of material | First dip | First hold | Second dip | Second hold | Peel loss (%) |
|---|---|---|---|---|---|
| Sweet potato | 10% NaOH 200° F. 60 sec. | 15 min. ambient | 3% NaOH 200° F. 240 sec. | 15 sec. ambient | 14.4 |
| Sweet potato (Exposed to atmospheric steam for 4 min. prior to application of caustic) | 10% NaOH 217° F. 30 sec. | 5 min. ambient | 5% NaOH 214° F. 60 sec. | 15 sec. ambient | 17.2 |
| Red beet | 10% NaOH 200° F. 15 sec. | 15 min. ambient | 3% NaOH 200° F. 120 sec. | 15 sec. ambient | 16.6 |
| Red Delicious apple | 10% NaOH 200° C. 60 sec. | 5 min. ambient | 3% NaOH 200° F. 240 sec. | 15 sec. ambient | 11.9 |

Having thus described the invention, what is claimed is:

1. A process of peeling fruits and vegetables, which consist of -
   a. applying a lye solution containing about 1 to 10% NaOH and at a temperature of 160°–217° F. to the unpeeled fruit or vegetable for a period of about 5 to 60 seconds,
   b. holding the so-treated fruit or vegetable at ambient temperature for about 5–30 minutes,
   c. applying a lye solution containing about 2 to 10% NaOH and at a temperature of 160°–217° F. to the so-treated fruit or vegetable for a period of 30 seconds to 4 minutes,
   d. holding the so-treated fruit or vegetable at ambient temperature for about 15 seconds to 5 minutes, and
   e. without exposing the so-treated fruit or vegetable to radiant or other heat, directly removing the loosened peel from the fruit or vegetable by dry brushing.

2. The process of claim 1 wheren the said fruit or vegetable is potato.

3. The process of claim 1 wherein the said fruit or vegetable is sweet potato.

4. The process of claim 1 wherein the said fruit or vegetable is red beet.

5. The process of claim 1 wherein the said fruit or vegetable is apple.

6. A process for peeling potatoes, which consist of -
   a. applying a lye solution containing 10% NaOH and at a temperature of 170° to 190° F. to unpeeled potatoes for a period of 45 to 60 seconds,
   b. holding the so-treated potatoes at ambient temperature for about 15 minutes,
   c. applying a lye solution containing 5% NaOH and at a temperature of 170° to 190° F. to the so-treated potatoes for a period of 45 to 90 seconds,
   d. holding the so-treated potatoes at ambient temperature for about 3 minutes, and
   e. without exposing the so-treated potatoes to radiant or other heat, directly removing the peel therefrom by non-abrasive dry brushing.

* * * * *